United States Patent [19]

Brill et al.

[11] 4,450,201

[45] May 22, 1984

[54] MULTIPLE-LAYER HEAT BARRIER

[75] Inventors: Klaus Brill, Korntal; Wolfgang Grothe, Tiefenbronn, both of Fed. Rep. of Germany

[73] Assignee: Robert Bosch GmbH, Stuttgart, Fed. Rep. of Germany

[21] Appl. No.: 311,065

[22] Filed: Oct. 13, 1981

Related U.S. Application Data

[63] Continuation-in-part of Ser. No. 283,513, Jul. 15, 1981, abandoned.

[30] Foreign Application Priority Data

Oct. 22, 1980 [DE] Fed. Rep. of Germany ....... 3039821

[51] Int. Cl.³ .............................................. B32B 15/00
[52] U.S. Cl. .................................... 428/336; 428/432;
    428/458; 428/469; 428/480; 428/696; 428/698
[58] Field of Search .............. 428/469, 696, 698, 432,
    428/458, 480, 336

[56] References Cited

U.S. PATENT DOCUMENTS

| | | | |
|---|---|---|---|
| 3,698,946 | 10/1972 | Kaspaul et al. | 428/472 |
| 4,017,661 | 4/1977 | Gillery | 428/472 |
| 4,022,947 | 5/1977 | Grubb et al. | 428/472 |
| 4,153,518 | 5/1979 | Holmes et al. | 427/126.2 |
| 4,166,876 | 9/1979 | Chiba et al. | 427/126.2 |
| 4,284,687 | 8/1981 | Dreyer et al. | 428/472 |

FOREIGN PATENT DOCUMENTS 197801 12/1976 Fed. Rep. of Germany ...... 428/432

*Primary Examiner*—George F. Lesmes
*Assistant Examiner*—E. Rollins Buffalow
*Attorney, Agent, or Firm*—Frishauf, Holtz, Goodman & Woodward

[57] ABSTRACT

To provide a heat barrier structure, for example a polyester or glass substrate (11, 21, 31) which includes a metal reflective layer (13, 25, 33) has, additionally, a dielectric cover layer applied, for example, in an argon-oxygen-nitrogen atmosphere, which forms a dielectric layer thereover which includes a nitride, so that the cover layer, or the layer or layers immediately adjacent the metal, will have improved resistance against external mechanical, chemical and electrochemical influences and specifically improved corrosion resistance, while retaining excellent light transmissivity characteristics and high reflection to long infrared heat radiation. The invention also provides a heat barrier structure in which a corrosion inhibiting protective layer is positioned between the transparent substrate and the metal reflective layer and the at least one dielectric cover layer. The invention also provides a heat barrier structure wherein the side of the transparent substrate which is not covered by said metal layer and said dielectric cover layer is covered by an anti-reflection layer to provide a structure having improved light transmission characteristics.

21 Claims, 4 Drawing Figures

MULTIPLE-LAYER HEAT BARRIER

This application is a continuation-in-part application of Ser. No. 283,513, filed July 15, 1981 now abandoned.

The present invention relates to a multiple-layer heat barrier, and method and more particularly to a heat barrier foil which permits passage of visible light and light in the near-infrared region, while blocking transmission of heat radiation therethrough.

BACKGROUND

Various types of selective radiation transmitting and radiation blocking foils and layers have been proposed, for example to prevent the heating of interior spaces by excessive sunlight in the summertime. Such foils, for example, include a reflective coating which reflects sunlight. Heat barriers also have been proposed to increase the efficiency of interior space heating by preventing radiation towards the outside in wintertime, by decreasing the transmission of heat, and hence heat losses from the interior of a heated space towards the outside ambient air (see, for example, German Patent Disclosure Document DE-OS No. 27 03 688 and corresponding U.S. Pat. No. 4,158,718 which is hereby incorporated in its entirety).

Sunlight barriers, as well as heat barriers, operate on the principle of reflection of radiation by a metal film applied to a substrate carrier, typically a flexible foil or a glass plate. The metal film is vapor-deposited, or applied by a similar process, such as atomization of a metal. Transmissivity of light within the visible spectral range of such a thin metal layer can be increased by an anti-reflection coating. Multi-layer systems including metallic and dielectric layers, have also been proposed. The metals which are usually used as the heat reflectivity layer are silver, gold, aluminum, and copper. The dielectric materials, that is, the electrically non-conductive layers, are metal oxides of high refractive index, such as, for example, $TiO_2$, $SiO_2$, $Ti_2O_3$, $Ta_2O_5$, $ZrO_2$, Sn oxide, bismuth oxide, indium oxide, or metal sulfides, such as for example, ZnS. Such multi-layer systems, applied to plastic foils or glass plates, are used as heat transmission barriers or to provide for a flat plane heating arrangement. Heat barriers should have a high light transmissivity within the visible spectral range, and a high reflectivity for infrared radiation, particularly of far infrared, that is, in a wave length of $\lambda = 10$ $\mu$m approximately for heat radiation from an interior space towards the outside.

THE INVENTION

It is an object to provide a heat barrier which has improved adhesion to an underlying foil or glass plate, good protection against corrosion, and high heat reflective properties, while having good transmissivity to light within the visible spectral range.

Briefly, a substrate carrier, such as for example glass, a polyester film or the like, has a metallic layer applied thereto, the metal, for example, being silver, gold, aluminum, copper, or the like. At least one dielectric cover layer is applied to the metal layer, the dielectric layer, in accordance with the invention, including a metal-nitrogen compound. Either the cover layer or the metal layer can be adhered to or connected to the substrate carrier.

More particularly, the at least one dielectric cover layer comprises at least one compound selected from the group consisting of the oxides of titanium, silicon, tantalum, and zirconium and zinc sulfide, and, in addition thereto a nitrogen compound having the same metal ion as said oxide or sulfide, while the metal layer is a transparent layer of at least one metal from the group consisting of silver, gold, aluminum or copper.

In accordance with a feature of the invention, the dielectric cover layer is applied to both sides of the metal layer, that is, the dielectric cover layer is applied directly on the substrate carrier, over which the metal layer is applied, which then is covered by another cover layer. The cover layer, for example, may be a mixture of a metal oxide, a metal nitride, and oxinitride, for example titanium dioxide and titanium nitride.

In accordance with a feature of the invention, the dielectric cover layer is applied by atomization in an argon-oxygen-nitrogen atmosphere on the metal layer, for example by means of a reactive magnetron atomization, the nitrogen being derived from the atmosphere within a vessel within which the atomization process is carried out.

The multi-layer system has the advantage of better adhesion to a substrate, typically a polyester foil, than a metal layer as such. Dielectric layers, covering a metal layer from both sides, effect excellent protection of the metal layer against corrosion. It is, however, possible to apply a metal layer directly on a carrier foil, or on glass, and covering only the outer or exposed side of the metal layer with the cover layer, particularly if the substrate is pretreated to improve adhesion.

The transmissivity to light of the metal layer depends on the reflectivity within the visible spectral range. The reflectivity is a function of the refractive index of the material. The metal layer which is applied has a relatively high capability of reflection, that is, a high index of refraction, within the visible spectral range. As such, then, and without improvement, its light transmissivity is not sufficiently high for the preferred light transmitting heat barrier elements of the present invention.

The dielectric cover layer can be so selected that its index of refraction, and thus the intensity of reflection and suitable matching of the layer thickness, results in interference phenomena within the visible spectral range. In an ideal situation, the indices of refraction n are so selected that $n_{air} : n_{cover\ layer} = n_{cover\ layer} : n\ \text{metal}$.

The thickness of the layers is so selected that $2\Delta = \lambda/2$; wherein $2\Delta$ is the length of the reflected ray in the cover layer, i.e. into the cover layer and back out. In the ideal case, reflection on the cover layer and at the dielectric layer are compensated. This, then, increases the transmissivity to light within the visible spectral range of the multi-layer system. The dielectric cover layer thus increases the light transmissivity.

Metal nitrides have not, in the past, been used for optical applications since the pure form of metal nitrides has insufficient transmissivity to radiation in the visible spectral range.

Combining metal nitrides, however, with other components has the unexpected advantage in the overall system that a substantial improvement of known multi-layer systems with respect to permanence of the overall system regarding external influences can be obtained. Such external influences are, for example, mechanical, chemical, and electrochemical influences. The transmissivity of the layers, in the visible spectral range, then will not deteriorate. The multi-layer system improves the corrosion resistance of the overall system, and is particularly resistant against attack by gaseous or liquid media. This improvement can be obtained by introducing metal nitride in the cover layer without, thereby, noticeably detracting from the transmissivity. The transmissivity to visible and near-infrared radiation, that is, $\lambda = 0.4$ to 1.4 $\mu$m, of the heat barrier system is high, that is, the overall transmissivity $D > 80\%$. In this wavelength range, the reflectivity for heat radiation of the sunlight is low, that is, $R \sim 10$–$60\%$. Consequently, a portion of the sunlight which causes heat can penetrate from the outside into the interior of a space through the barrier system arranged, for example, inside or on a window, in order to heat the interior of the space.

The heat barrier prevents, however, re-radiation of the heat from the interior towards the outside. In the range of far-infrared, that is, a wavelength of radiation of a black body at room temperature of $\lambda \sim 10$ $\mu$m, the heat barrier system has a high reflectivity, $R \sim 95\%$. Thus, heat radiation is reflected back into the interior space or, in other words, exchange of heat radiation with the outside is substantially reduced due to the low coefficient of emission of the barrier layer system.

Consequently, the heat barrier layer has good transmissivity for solar energy in order to heat an interior space, but prevents radiation of the received heat towards the outside.

It has been found particularly desirable to use, in a multi-layer system, silver for the metal and titanium dioxide for the dielectric. By cathodic atomization, that is, by reactive atomization in an argon-oxygen-nitrogen atmosphere, cover layers having good stability can be made. Due to the high atomization rates, use of magnetron atomization and movable web, vapor deposition is particularly suitable.

The cover layer of the multi-layer system can be obtained from a mixture of the various compounds to be used, such as $TiO_2$, TiN, or oxygen-nitrogen compounds; it is also possible, however, to apply the respective compounds in separate operating steps as single layers. This can be easily obtained by running a web repeatedly through the apparatus. The very thin layers can be readily obtained at relatively high web or tape moving speeds, so that the process is economically highly suitable. For example, a titanium dioxide layer in which a $TiO_2TiN$ or a pure TiN is intercalated can be made. This has the advantage that in a very thin layer a higher proportion of TiN can be introduced to further increase the protective effect thereof.

The corrosion resistance can further be increased by constructing the metal oxide layer, for example a $TiO_2$ layer, sub-stoichiometrically, that is, with an oxygen deficiency. sub-stoichiometric layers for titanium oxide are known in the atomization technology. These layers have the property that they oxidize under the influence of oxygen in air upon being exposed to ambient air. The layer, in accordance with the invention, does not, however, have this effect. Due to its structure and composition it is stable, so that mere exposure to the oxygen of air does not result in oxidation; only stronger oxidizing agents, such as ozone, can cause oxidation.

A particularly suitable layer is a $TiO_x$ layer in which $x = 1.60$–$1.98$. This increases the absorption of radiation from the interior space slightly by about 0.5 to 1%; the influence of diffused oxidizing materials on the metal layer, however, is reduced by the reaction of the metallic titanium with the $TiO_x$ layer. This reaction appears to cause the diffusion paths to become sealed or denser. The desired protection against corrosion is thus obtained and subsequent oxidation does not occur in the pure metal layer but, if at all, in the dielectric layer due to vacancies therein. Forming the titanium dioxide portion within the layer system results in an additional improvement in resistance to corrosion.

Another embodiment of the invention utilizes a corrosion inhibiting protective layer between the transparent substrate and the dielectric layer(s) and light transparent metal layer. The corrosion resistance of the applied layers is substantially improved since conditions which adversely influence corrosion during lengthy storage are substantially eliminated. The corrosion inhibiting protective layer also improves the resistance of the multi-layer assembly against the influence of heat and radiation. This improves the shelf life and the useful service life of the product. The corrosion protective layer has the additional advantage that irregularities on the surface of the substrate carrier due to manufacturing non-uniformities are eliminated by applying a uniform protective cover layer on the substrate surface. This particularly eliminates formation of striations or the like in the completed multi-layer system.

The protective layer forms a uniform base for the multi-layer system to be applied thereover and, since it is applied in a vacuum apparatus, is not subject to detrimental contamination which might have an adverse effect on the formation (manufacture) of the layers.

It is preferred to utilize as the material forming the corrosion inhibiting layers, a material having a lower refractive index than the substrate thereby improving the optical characteristics of the multi-layer system. The corrosion inhibiting layer is preferably a magnesium fluoride on which, in turn, a three-component layer system or other multi-layer system is applied. Alternate materials include cryolite ($Na_3AlF_6$), lithium fluoride, calcium fluoride, and sodium fluoride, all of which exemplify the useful alkali and alkaline earth metal fluoride corrosion protective layers.

Another embodiment of the invention provides the multi-layer light transmissive system on one side of a substrate which has an anti-reflection coating applied to the other side of the substrate. The anti-reflection layer is of a material whose optical properties are matched to that of the substrate to thereby improve the percentage light transmission thereof. This is preferably accomplished by an anti-reflective coating material having a lower refractive index than the substrate. The fluorides discussed in the preceding paragraph which are useful as the corrosion inhibiting protective layer are also useful and preferred as the anti-reflection coating or layer.

The multi-layer system containing the corrosion inhibiting protective layer may also contain an anti-reflection layer on the opposed surface thereof to further improve the light transmittivity.

Suitable metal oxides are particularly the oxides of titanium, silicon, tantalum, zirconium, tin, bismuth and indium. Metal sulfides such as zinc sulfide are also suitable as dielectrics.

DRAWINGS

Figure 1:
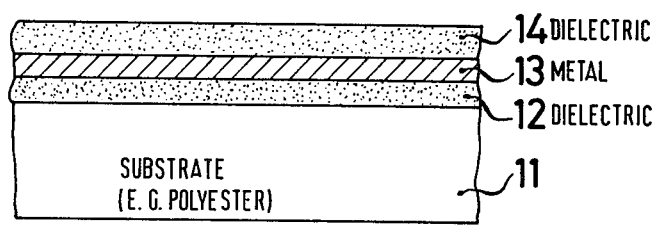
FIG. 1 is a highly schematic cross-sectional view of a multi-layer system in which a metal layer is sandwiched between two dielectric layers, one of which is applied to a substrate.

Embodiment of FIG. 1: The substrate 11 is, for example, a polyester foil of 50 μm thickness, on which a dielectric layer 12, a metal layer 13, and a second dielectric layer 14 are applied. The carrier may be facing the side remote from the space to be protected against heat radiation, but this is not a necessary arrangement. If placed remote from the interior space, absorption of radiation within the carrier is avoided. As above noted, a different arrangement can be selected, that is, the substrate may face the outside of the room which has the advantage of lower emission of the cover layer. The electrically conductive metal layer 13 preferably is silver; it is positioned between two dielectric layers, although strictly, only layers 12 or 14, preferably layer 14, would be needed. Other metals which can be used are, e.g., gold, aluminum, or copper.

Basically, three ways of constructing multi-layer systems can be used, as illustrated in the three figures of the drawings.

Embodiment of FIG. 1: The cover layers 12, 14 in contact with the metal layer 13 are applied, each, in a single working step, for example by cathodic atomization. The cover layers 12, 14, each covering one side of the metal layer 13, are formed of an essentially homogenious mixture of a metal oxide, for example titanium dioxide, a metal nitride, for example TiN, and oxinitrides which are present, such as $TiO_2TiN$. The metal layer 13 is embedded on both sides in the respective cover layer. The substrate 11 is a polyester foil, or may be glass. The metal layer 13 could be applied directly to the substrate 11, and covered only with one dielectric layer, in this case layer 14.

The technical and chemical specifications of the respective layers are:

1. Silver, applied at a mass rate $m_{Ag}=8$–14 μg/cm$^2$. A preferred rate is 11 μg/cm$^2$. The square resistance of the preferred layer is 7Ω.

2. Cover layer 12, 14: The total mass cover of titanium for both layers 12 & 14 is $m_{Ti}=8$–16 μg/cm$^2$, preferably 12 μg/cm$^2$. Each one of the layers 12, 14 will have half of the above-given titanium content.

The dielectric layers according to a preferred embodiment of the invention further include oxygen and nitrogen in the form of oxides and nitrides and oxinitrides in the following ranges, by weight:

60–70% titanium
 2–20% nitrogen
 10–40 oxygen.

The preferred layer has the composition:

65.4% titanium
 12.7% nitrogen
 21.9% oxygen, percentages by weight.

When the dielectric layer comprises a metal oxide other than titanium, the nitride content of the dielectric layer should be in an amount not in excess of 60% by weight of the total oxygen and nitrogen content of the dielectric layer.

Figure 2:
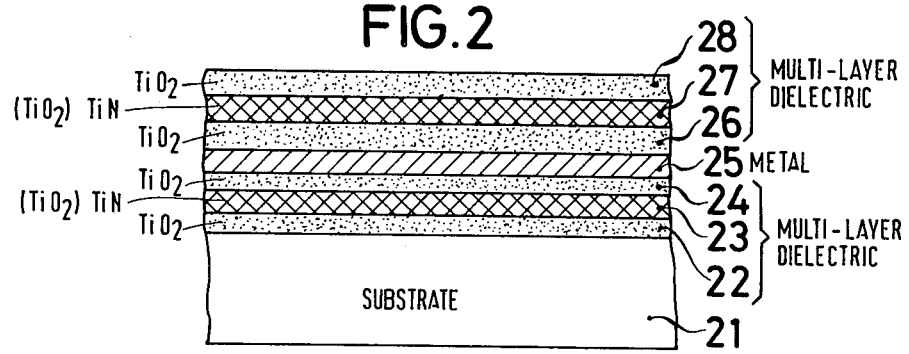
FIG. 2 is a schematic cross-sectional view in whith the dielectric layers themselves are composite layers.

Embodiment of FIG. 2: The substrate, again, may be polyester, glass or the like. A metal layer 25 is sandwiched between multiple-layer dielectric layers. The multiple-layer dielectric layers are made in sequential passes through an atomization apparatus. The metal layer, again, preferably is silver. It is possible, for example, to apply the following multiple-layer dielectric layers 22, 23, 24 and 26, 27, 28 having this composition:

Layers 22, 25: $TiO_2$; layers 23, 27: TiN or $TiO_2$-TiN; layers 24, 28: $TiO_2$.

The following specifications are important.

In the multiple-layer system, the titanium constituent contributes to one-third each on the three sub-layers, that is, the mass content of titanium per layer is one-third for each sub-layer, so that $m_{Ti}=1.3$–2.7 μg/cm$^2$, preferably about 2 μg/cm$^2$. The nitrogen-containing layer can be pure titanium nitride in stoichiometric composition or, as above referred to, a mixture of titanium oxide and titanium nitride. As least 50% of the titanium should be present in the form of the nitride. The optical effect of the multiple-layer dielectric corresponds to that of the composite single-layer dielectric with homogeneous distribution of the components, as described in connection with FIG. 1.

In manufacture, the substrate, for example a polyester foil of 0.05 mm thickness has the first multiple-layer dielectric applied thereto, in which layer 22 is $TiO_2$, layer 23 is $TiO_2TiN$, or pure TiN. A $TiO_2$ layer is applied thereover; over that, a pure metal layer 25, for example a silver layer in accordance with the specification of FIG. 1, is applied on which a further dielectric multiple-layer system 26–28 is applied, in which the layers 26–28 correspond in their construction to the layers 22–24.

The heat barrier in accordance with FIG. 1, using a $TiO_2$—Ag—$TiO_2$ system can reach a transmissivity to light within the visible spectral range of about 84%. The losses of about 16% result by reflection at the boundary surfaces due to insufficient matching as well as absorption in the substrate 11, and in the various respective layers. A freely hanging foil 11 causes about 5% reduction due to reflection at the uncoated side of the foil. The index of refraction of the polyester foil n=1.6, approximately.

Figure 3:
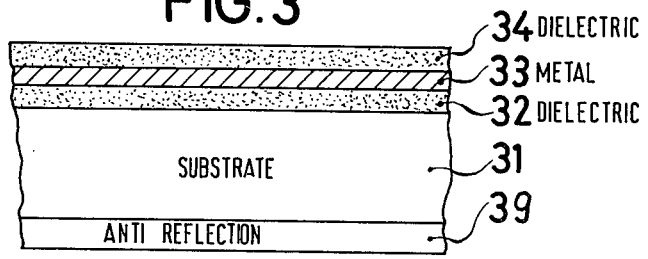
FIG. 3 is a schematic cross-sectional view generally similar to FIG. 1, in which the substrate has a further layer, i.e. applied thereto.

Embodiment of FIG. 3: The side of the foil which does not have a metal-dielectric system applied thereto, that is, for purposes of the discussion, the back side, has an anti-reflection coating 39 applied to the substrate 31. The anti-reflection coating 39 permits optical matching of the back side of the layer with respect to the adjacent medium. Foil suspended or stretched in air can thus reduce reflection at the interface by about 4% so that the overall transmissivity will rise from 84% to 88%. The respective layers 32, 33, 34 may correspond to the layers 12, 13, 14 of FIG. 1, or to the layers 22–24, 25, 26–28 of FIG. 2.

The increased resistance to corrosion is the nitrogen portion of the compound in the dielectric cover layer applied to the metal layers 13, 25, 33.

Figure 4:
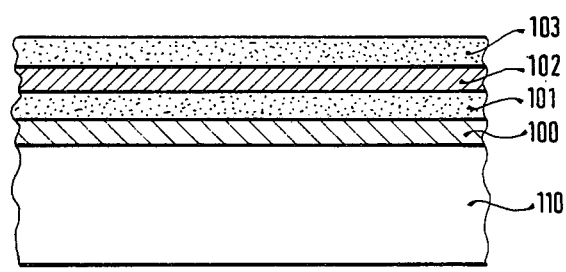
FIG. 4 is another schematic cross-sectional view in which a corrosion inhibiting layer is applied between the substrate and the multi-layer coating.

Embodiment of FIG. 4: A carrier of a plastic foil for example a polyester foil 110, has a corrosion inhibiting protective layer 100 applied thereto. The corrosion inhibiting layer 100 preferably is magnesium fluoride on which, in turn, a three-component layer is applied. Alternates are disclosed hereinbefore.

The three-component layer, in the embodiment shown, has a metallic layer 102, preferably of silver which has, at both sides, non-conductive (dielectric) layers 101, 103 thereover, covering the silver layer. The upper layer 103 can be eliminated further combinations of layers are also possible, as disclosed herein. For the dielectric layers, preferably, metal oxides or metal sulfides are applied, at either side of the layer 102. Particularly suitable are: titanium oxide, tin oxide, bismuth oxide, indium oxide, tantalum oxide and zinc sulfide. Particularly good results are obtained with a dielectric layer which is applied on either side over a silver layer 102 and which comprises zinc sulfide layers 101, 103. The layers may be vapor-deposited.

Methods of making the barriers:

EXAMPLE 1, WITH REFERENCE TO FIG. 1

A polyester foil of 0.05 mm thickness, supplied in the form of a web, has a TiO$_2$TiN layer applied by reactive magnetron atomization. Partial pressures of the reaction gases are: $P_{Ar}=5.10^{-4}$ mbar, $P_{O2}=3.10^{-4}$ mbar, $P_{N2}=3.10^{-4}$ mbar. Atomization rate: 140 nm/min, tape or web speed: 0.5 m/min. Thereafter, a silver layer is applied at an argon partial pressure $p_{Ar}=1.10^{-3}$ at a rate of 100 nm/min. A second TiO$_2$TiN layer, similar to the first layer 12, is then applied over the silver layer.

EXAMPLE 2 WITH REFERENCE TO FIG. 2

The various single layers are applied by exposing the substrate 21 in different atmospheres and passing it several times along the cathode. The web or tape speed is so selected that the required layer thickness is just reached.

The substrate foil of 0.05 mm thickness has a TiO$_2$ layer applied, for example in an argon-oxygen mixture in which the oxygen partial pressure $p_{O2}=5.10^{-4}$ mbar. Thereafter, in a nitrogen partial pressure atmosphere $p_{N2}$ of $5.10^{-4}$ mbar, a TiN layer is applied by mass coating, as before, and then, again, by atomization in an argon-oxygen mixture as above, the layer 24 is applied thereover. Subsequently, as described in connection with Example 1, a layer of silver is applied, then again a TiO$_2$ layer, a TiN layer, and a final TiO$_2$ layer, as above described.

EXAMPLE 3

Rather than applying a pure TiN layer as the layer 23, 27, respectively, a TiO$_2$TiN layer can be embedded in the TiO$_2$ layers in order to form the multi-layer systems, all other conditions being equal.

EXAMPLE 4

To make a sub-stoichiometric TiO$_x$ layer, the oxygen partial pressure $P_{O2}$ is decreased by 15% with respect to that which would result in stoichiometric composition. This increases the absorption of the layer independent of wave length by about 1%. The remaining conditions of manufacture are the same, and may correspond to Examples 1-3.

EXAMPLE 5 WITH REFERENCE TO FIG. 3

The foil has layers 32-34 on a substrate as before. The back side of the foil, in a further method step, which can be carried out in the same or a subsequent path through the atomization apparatus, has a λ/4 magnesium fluoride layer 39 applied thereto. The thickness of the layer is about 0.09 μm (90 Å). The transmission of the overall system is approximately 88%.

The multi-lyer system besides being useful as a heat barrier, is also appoicable as a heatable multi-layer system and, due to the low light losses within the visible range of the spectrum, can be used advantageously for use in automobile windows. The high corrosion resistance of the multi-layer system containing the corrosion inhibiting protective layer is particularly important in such an application.

The light transmittive heat barrier metal layer 13,25, 33,102 is broadly between about 0.003 and 0.03 microns thick and preferably between about 0.006 and 0.02 microns thick.

The dielectric layers 12,14,22-28, 32,34,101, and 103 are broadly between about 0.003 and 0.05 microns thick and preferably between about 0.005 and 0.03 microns thick.

The anti-corrosion layer (corrosion inhibiting protective layer 100) is broadly between about 0.05 and 0.20 microns thick and preferably between about 0.08 and 0.12 microns thick.

The anti-reflection layer 39 is broadly between about 0.06 and 0.15 microns thick and preferably between about 0.09 and 0.11 microns thick.

The substrate layer 11,21,31,110 when it is a plastic foil such as polyester is broadly between about 4 and 200 microns thick and preferably between about 20 and 100 microns thick. When it is a glass layer, it is broadly between about 100 and 10,000 microns thick and preferably between about 500 and 6,000 microns thick.

In the multi-layer system of the invention a film transparent electrically conducting metallic layer is used. The sheet resistance of this layer is in the range of 6-10 $r_o$, preferably 8 $r_o$. The low sheet resistance in connection with the high transmissivity of visible light and stability of the system allows use of this foil for special applications where heating is required for instance for windscreen-heating of vehicles.

We claim:

1. Multilayer heat barrier system having:
   a transparent substrate;
   a transparent metal layer;
   at least one transparent layer applied to the side of the metal layer remote from the substrate, constituting an outer dielectric cover layer, said at least one layer comprising a mixture of (1) at least one compound selected from the group consisting of the oxides of titanium, silicon, tantalum and zirconium, zinc sulfide (2) at least one nitrogen compound having the same metal ion as said oxide or sulfide.

2. System according to claim 1, wherein at least one transparent cover layer is interposed between said transparent substrate and said transparent metal layer, constituting an intermediate dielectric coating, said at least one layer of said intermediate dielectric coating comprising at least one compound selected from the group consisting of the oxides of titanium, silicon, tantalum and zirconium and zinc sulfide and a nitrogen compound having the same metal ion as said oxide or sulfide.

3. System according to claim 2, in which said at least one transparent cover layer of said outer dielectric coating and also said at least one layer of said intermediate dielectric coating both comprise a mixture of titanium dioxide and titanium nitride.

4. System according to claim 3, wherein each of said intermediate and outer coatings each comprises oxygen and nitrogen compounds of titanium, having a titanium content of between about 60 and 70% by weight, a nitrogen content of between about 2 and 20% by weight and an oxygen content of between about 10 and 40% by weight.

5. System according to claim 3, wherein each of said intermediate and outer coatings comprises oxygen and nitrogen compounds of titanium, having a titanium content of about 65% by weight, a nitrogen content of about 13%, and an oxygen content of about 22%.

6. System according to claim 3, wherein an anti-reflection layer having an index of refraction which is less than the index of refraction of the substrate is applied on the side of the substrate opposed to the side of the substrate on which said transparent metal layer and said at least one transparent dielectric cover layer are applied.

7. System according to claim 2, in which said at least one transparent cover layer of said outer dielectric coating and also said at least one layer of said intermediate dielectric coating both comprise a mixture of titanium oxide, titanium nitride and titanium oxynitride.

8. System according to claim 2, further comprising a dielectric layer applied to the substrate remote from said metal layer.

9. System according to claim 8, wherein said further dielectric layer comprises a λ/4 magnesium fluoride layer having a thickness of about 0.09 μm.

10. System according to claim 1 or 2, wherein said at least one transparent metal layer is a layer of at least one metal from the group consisting of silver, gold, aluminum and copper.

11. System according to claim 10 in which an additional dielectric layer, other than said corrosions protective layer, is interposed between said substrate and said metallic layer, said additional dielectric layer being of oxide and nitride of a metal selected from the group consisting of titanium, tantalum and zirconium and having a thickness dimensioned for maximizing visible light transmission through said system.

12. System according to claim 1, in which said at least one transparent cover layer comprises a mixture of titanium oxide, titanium nitride and titanium oxynitride.

13. System according to claim 1, in which the thickness of said dielectric outer coating is such as to reduce reflection of visible light through the combination of said dielectric outer coating and said transparent metal layer.

14. System according to claim 13, in which the thickness of said intermediate dielectric coating is such that to optimize transmission of visible light through the system.

15. System according to claim 13, in which the thickness of said outer dielectric coating is between 3 and 50 nanometers thick.

16. System according to claim 14, in which said intermediate dielectric coating is between 3 and 50 nanometers thick.

17. System according to claim 1, in which said at least one transparent cover layer comprises a mixture of titanium dioxide and titanium nitride.

18. Multilayer heat barrier systems, having high reflectivity in the far infrared spectral region and high transmissivity within a visible spectral region and in the near infrared spectral region comprising
a transparent substrate;
a metallic layer of silver, gold, aluminum, or copper, and at least one transparent dielectric layer applied to the metallic layer said dielectric layer being of oxide and nitride of a metal selected from the group consisting of titanium, tantalum and zirconium and having a thickness and an index of refraction suitable for minimizing reflection of visible light and thereby improving visible light transmission; and
a corrosion protective layer of magnesium fluoride positioned between the substrate and the dielectric cover layer.

19. System according to claim 18, wherein at least one further layer of a metal oxide or metal sulfide, selected from the group consisting of titanium, oxide, tin oxide, bismuth oxide, indium oxide, tantalum oxide and zinc oxide, is applied on said dielectric layer or on said metal layer.

20. System according to claim 19, wherein a silver layer coated on both sides with a zinc sulfide layer is applied to the corrosion protective layer.

21. System according to claim 18, in which the total dielectric layer thickness overlying said metallic layer is between 3 and 50 nanometers.

* * * * *

UNITED STATES PATENT AND TRADEMARK OFFICE
CERTIFICATE OF CORRECTION

PATENT NO. : 4,450,201
DATED : May 22, 1984
INVENTOR(S) : Klaus BRILL et al

It is certified that error appears in the above-identified patent and that said Letters Patent is hereby corrected as shown below:

Col. 8, line 35 (claim 1) after the ";" insert -- and --;

line 42 before "zinc" insert -- and -- and after "sulfide" also insert -- and --;

line 45 (claim 2) delete "cover";

line 49, after "comprising" insert -- a mixture of (1) --;

line 51, before "a nitrogen" insert -- (2) at least one --.

Signed and Sealed this

Twenty-third Day of October 1984

[SEAL]

Attest:

GERALD J. MOSSINGHOFF

Attesting Officer     Commissioner of Patents and Trademarks